US008495206B2

(12) United States Patent
Borghetti et al.

(10) Patent No.: US 8,495,206 B2
(45) Date of Patent: Jul. 23, 2013

(54) METHOD AND SYSTEM FOR JOB SCHEDULING IN DISTRIBUTED DATA PROCESSING SYSTEM WITH IDENTIFICATION OF OPTIMAL NETWORK TOPOLOGY

(75) Inventors: Stefano Borghetti, Rome (IT);
Gianluca Della Corte, Rome (IT);
Leonida Gianfagna, Rome (IT);
Antonio M. Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/840,829

(22) Filed: Jul. 21, 2010

(65) Prior Publication Data
US 2011/0022706 A1   Jan. 27, 2011

(30) Foreign Application Priority Data
Jul. 21, 2009   (EP) .................................. 09165946

(51) Int. Cl.
*G06F 9/46*   (2006.01)
*G06F 15/173*   (2006.01)

(52) U.S. Cl.
USPC ............................ 709/224; 718/105; 709/223

(58) Field of Classification Search
USPC .................................. 709/224, 223; 718/105
See application file for complete search history.

(56) References Cited

U.S. PATENT DOCUMENTS

| 6,463,532 | B1 | 10/2002 | Reuter et al. |
| 6,651,242 | B1 | 11/2003 | Hebbagodi et al. |
| 7,275,014 | B1* | 9/2007 | Koren et al. ................ 702/150 |
| 7,293,073 | B2 | 11/2007 | Jacobs et al. |
| 8,040,798 | B2* | 10/2011 | Chandra et al. ............... 370/229 |
| 8,185,481 | B2* | 5/2012 | Long et al. ...................... 706/12 |
| 2004/0103194 | A1 | 5/2004 | Islam et al. |
| 2006/0080422 | A1* | 4/2006 | Huberman et al. ........... 709/223 |
| 2007/0233626 | A1 | 10/2007 | Rupp et al. |

(Continued)

FOREIGN PATENT DOCUMENTS

WO   WO2009127488 A   10/2009

OTHER PUBLICATIONS

Das et al.; , "K-node connected power efficient topologies in networks with sectored antennas," Military Communications Conference, 2005. MILCOM 2005. IEEE , vol., No., pp. 1319-1325 vol. 2, Oct. 17-20, 2005.*

(Continued)

*Primary Examiner* — Wing F Chan
*Assistant Examiner* — Kostas Katsikis
(74) *Attorney, Agent, or Firm* — Yee & Associates, P.C.; Jeffrey S. Labaw

(57) ABSTRACT

The method of the present invention provides an automatic and optimized selection of the network topology for distributing scheduling of jobs on the computers of the modified network topology. The automatic and optimized selection of the network topology starts from the current topology and a desired number of additional connections. In this way the method of the present invention provides a higher convergence speed for the modified consensus algorithm in comparison, e.g., to a simple ring network. The method exploits the so called small-world networks. Small-world networks are more robust to perturbations than other network architectures. The preferred embodiment provides a workload scheduling system which is highly scalable to accommodate increasing workloads within a heterogeneous distributed computing environment. A modified average consensus algorithm is used to distribute network traffic and jobs amongst a plurality of computers.

10 Claims, 6 Drawing Sheets

Fig. 1

U.S. PATENT DOCUMENTS

| | | | |
|---|---|---|---|
| 2009/0207894 A1* | 8/2009 | Nefedov | 375/219 |
| 2009/0260012 A1* | 10/2009 | Borghetti et al. | 718/102 |
| 2009/0319288 A1* | 12/2009 | Slaney et al. | 705/1 |
| 2009/0320029 A1* | 12/2009 | Kottomtharayil | 718/102 |
| 2010/0128432 A1* | 5/2010 | Miller | 361/679.54 |

OTHER PUBLICATIONS

Boyd, Stephen; Kim, Seung-Jean; Xiao, Lin; "Distributed Average Consensus with Least-Mean-Square-Deviation" Journal of Parallel and Distributed Computing; vol. 67; 2007; pp. 33-46; Department of Electrical Engineering, Stanford University, Stanford, CA, USA; Center for Mathematics of Information, California Institute of Technology, Pasadena, CA, USA.

Mostefaoui, A. Rajsbaum, S; Raynal, S; Roy, M; "Efficient Condition-Based Consensus" Proceedings of the 8th International Colloquium on Structural Information and Communication Complexity; 2001; pp. 275-291; SIROCCO'01; Carleton University Press; USA.

Akl, S; Alsalih, W; Hassancin, H; " Energy-Aware Task Scheduling: Towards Enabling Mobile Computing over MANETs" Parallel and Distributed Processing Symposium; Proceedings. 19th IEEE International; p. 242a; 2005; Apr. 4-8, 2005; Denver, CO; USA.

Fizzano, Perry; Karger, David; Wein, Joel; "Job Scheduling in Rings"; In Journal of Parallel and Distributed Computation; 34:2; 1997; SPAA '94.

Herilhy, Maurice; Rajsbaum, Sergio; "Set Consensus Using Arbitrary Objects"; In Proceedings of thirteenth annual ACM symposium on Principals of distributed computing; 1994.

Cunningham, H. Conrad; Vazhkudai, Sudharshan; "A Reusable Software Framework for Distributed Decision-Making Protocols"; Department of Computer and Information Science; University of Mississippi; University, MS 38677, USA.

Appleby, Karen; Goldszmidt, German; "Using Automatically Derived Load Thresholds to Manage Compute Resources On-Demand;" Integrated Network Management; 9th IFIPppppppppp IEEE International Symposium; May 15-19, 2005; Nice, France; 13 pages (pp. 747-760); Piscataway, NJ; USA.

Reza, Olfati-Saber; Fax, Alex J.; Murray, Richard; "Consensus and Cooperation in Networked Multi-Agentsystems," Proceedings of the IEEE Jan. 1, 2007; New York, USA; 18 Pages (pp. 215-233).

Kingston, Derek B.; Beard, Randal, W; "Discrete-Time Average-Consensus under Switching Network Topologies," Proceedings of the American Control Conference; Jun. 14-16, 2006 Minneapolis, MN, USA 6 pages (pp. 3551-3556).

Rabbat, Michael G.; Nowak, Robert D.; Buckalew James A.; "Generalized Consensus Computation in Networked Systems with Erasure Links," 2005 IEEE 6th Workshop in Wireless Communications; Jun. 2-8, 2005; New York, New York, USA 5 pages (pp. 1088-1092).

Reza; American Control Conference, 2005. Proceedings of the 2005 vol. , Issue , Jun. 8-10, 2005 pp. 2371-2378 vol. 4 Digital Object Identifier 10.1109/ACC.2005.1470321.

Yoonsoo Kim, et al; "On Maximizing the Second Smallest Eigenvalue of a State-dependent Graph Laplacian", IEEE Transactions on Automatic Control, vol. 51, No. 1, Jan. 2006.

Olfati-Saber, et al. "Consensus problems in networks of agents with switching topology and time-delays". IEEE Transactions on Automatic Control IEEE USA, vol. 49, No. 9, Sep. 2004, pp. 1520-1533.

Foster C. Kesselman; "19.2.1 Condor" In: "Grid 2 Blueprint for a New Computing Infrastructure". 2004, Elsevier, San Francisco, CA, US. pp. 288-291.

FR920080230PCT (EP2010/056727) filed May 17, 2010. International Search Report dated Feb. 21, 2011.

* cited by examiner

METHOD AND SYSTEM FOR JOB SCHEDULING IN DISTRIBUTED DATA PROCESSING SYSTEM WITH IDENTIFICATION OF OPTIMAL NETWORK TOPOLOGY

TECHNICAL FIELD

The present invention relates to the field of computer network, more particularly of job scheduling systems in a distributed computing environment.

BACKGROUND OF INVENTION

Job scheduling and workload balancing among a plurality of resources connected with a network is an increasingly important component of an IT environment. Many grid computing environments are driven by the scheduling of work across a distributed set of resources (e.g., computation, storage, communication capacity, software licenses, special equipment, etc.). In essence, scheduling is an optimization problem, which is fairly straightforward when only one resource type is involved. However, whilst further performance improvements can be achieved by including more resource variables in the scheduling process, the resulting multivariate optimization becomes a difficult mathematics problem.

State of the art job scheduling systems normally employ a master/agent architecture, wherein jobs are set up, scheduled and administered from a central server (known as a "master" server). The actual work is done by agents installed on the other servers. In use, the master maintains and interprets information relating to the jobs, available servers etc., so as to decide where to assign jobs. The agents, in turn, await commands from the master, execute the commands, and return an exit code to the master. While the master/agent architecture allows tight control over jobs, the need for the master and agents to remain synchronised (and corresponding dependency on the availability of the network and the master) is a serious limitation of the architecture. In a related manner, the highly-centralized nature of network traffic between the master and agents can degrade the overall performance of the architecture. Another problem is the limited scalability of the master/agent architecture. In particular, a master can support only a limited number of agents and creating a new master or instance creates a new and separate administration, so that the more instances created, the more complex administration activities become.

European Patent Application No. 08154507.1 filed on 15 Apr. 2008 by the same Applicant discloses a workload scheduling system which is highly scalable to accommodate increasing workloads within a heterogeneous distributed computing environment. More particularly, the preferred embodiment employs a modified average consensus algorithm to evenly distribute network traffic and jobs amongst a plurality of computers. State information from each computer is propagated to the rest of the computers by the modified average consensus algorithm, thereby enabling the preferred embodiment to dispense with the need for a master server, by allowing the individual computers to themselves select jobs which optimally match a desired usage of their own resources to the resources required by the jobs. A drawback of the above method is that the user establishes a virtual network comprising a logical topology of the computers. In other words, it is the user's responsibility to select the right topology and this can bring to a wrong selection which may jeopardize the efficiency of the network.

It would be desirable to guide the user in this selection process or even better being able to count on a reliable method which determines the best solution according to predetermined parameters.

It is an object of the present invention to provide a technique which alleviates the above drawback of the prior art.

SUMMARY OF THE INVENTION

In a preferred embodiment, the present invention provides a method, in a network of a plurality of N computers being connected together, for executing jobs based on computation of an improved network topology, the improved network topology including a number C of additional connections with respect to the current topology, the method including the steps of representing the current topology of the network of the plurality of N computers by means of N×N Laplacian matrix M wherein the values $l_{i,j}$ are defined as follows $$l_{i,j} := \begin{cases} \deg(v_i) & \text{if } i = j \\ -1 & \text{if } i \neq j \text{ and } v_i \text{ adjacent } v_j \\ 0 & \text{otherwise} \end{cases}$$

wherein $\deg(v_j)$ is the number of nodes that are connected to the node i and wherein $1 <= i <= N$ and $1 <= j <= N$; then the N×N Laplacian matrix $M_1$ is calculated, having $\text{Tr}(M_1) = \text{Tr}(M) + C*2$ and having the greatest possible second-smallest eigenvalue; the topology is thus modified into an improved topology by adding C additional connections according to the calculated N×N Laplacian matrix $M_1$; then, starting from the modified network topology for distributing scheduling of jobs on the computers of the modified network topology.

In a further embodiment of the present invention it is provided a system comprising components adapted to implement the method above.

In another embodiment a computer program is provided which realizes the method above when run on a computer.

BRIEF DESCRIPTION OF THE DRAWINGS

Embodiments of the invention will now be described, by way of example only, by reference to the accompanying drawings, in which.

DESCRIPTION OF A PREFERRED EMBODIMENT

The method of the present invention can help to solve the problem of the prior art by providing an automatic and optimised selection of the network topology starting from the current topology and a desired number of additional connections. In this way the method of the present invention provides a higher convergence speed for the modified consensus algorithm in comparison e.g. to simple ring network. The method exploits the so called small-world networks. Small-world networks are more robust to perturbations than other network architectures, in fact in a random network, in which all nodes have roughly the same number of connections, deleting a random node is likely to increase the mean-shortest path length slightly but significantly for almost any node deleted. In this sense, random networks are vulnerable to random perturbations, whereas small-world networks are robust.

Figure 1:
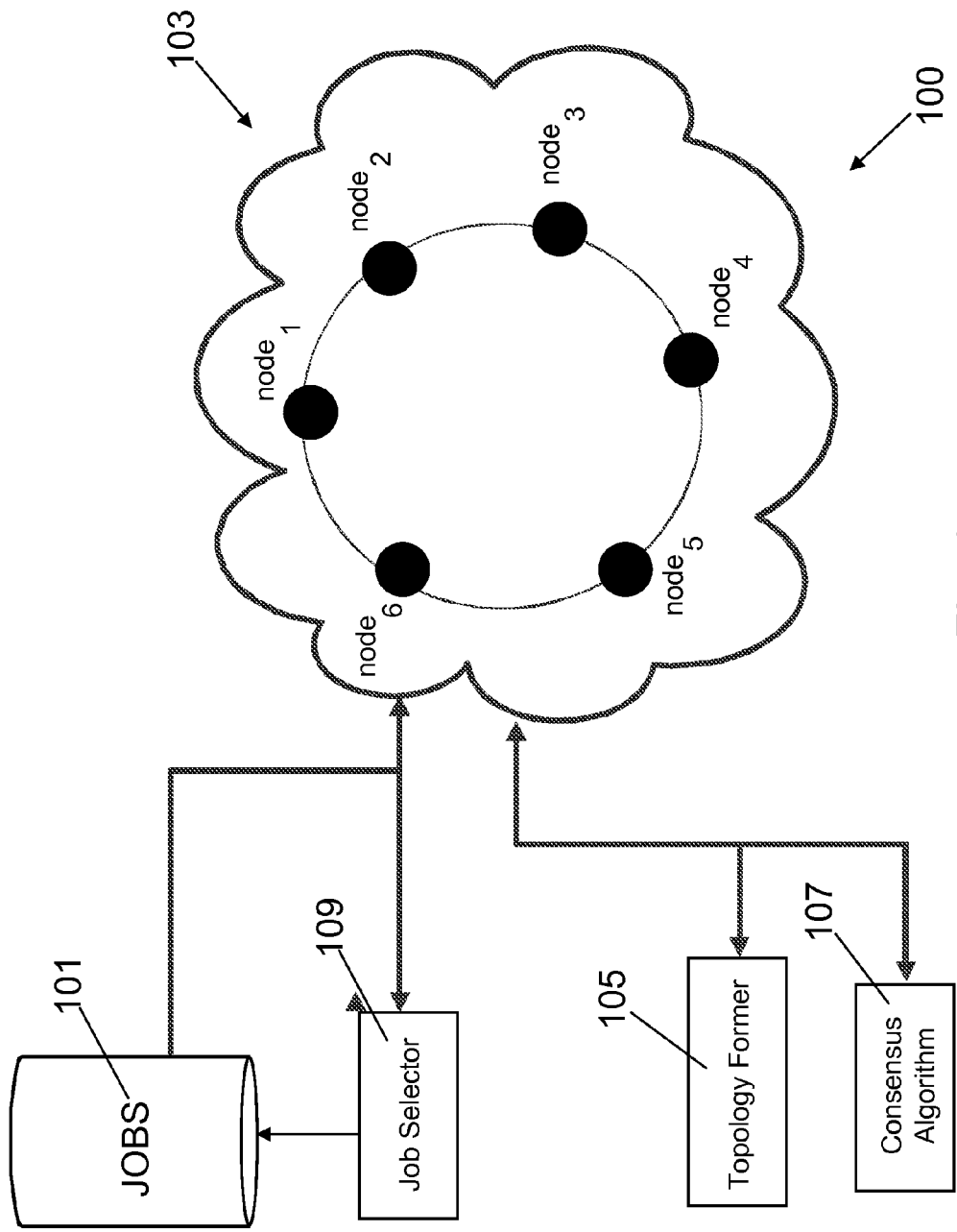
FIG. 1 is a block diagram of a software architecture of a workload scheduling system of the preferred embodiment with a representation of a ring topology.

As shown in FIG. 1, the preferred embodiment 100 comprises a repository 101 of jobs to be performed in a distributed heterogeneous network 103.

For simplicity, assume that the distributed network 103 comprises n nodes wherein each node (node$_i$) possesses a number of resources. The preferred embodiment employs a topology-forming algorithm 105 which will be discussed in deeper details; a modified average consensus algorithm 107 is used to enable nodes in the distributed network 103 to advise other nodes in the network of their current status and availability to execute new jobs. The preferred embodiment further comprises a job-selection module 109, which enables the nodes in the distributed network 103 to select an optimal job (job$_k$) (to execute next) from the job repository 101, in accordance with a user-defined desired usage of the resources of each node (node$_i$) and the resource requirements of the job (job$_k$).

The topology forming algorithm 105 establishes a virtual network comprising a logical topology of the nodes in the distributed heterogeneous network 103. Within, the virtual network, the logical topology establishes which nodes can communicate with each other. In particular, the logical topology is defined so that each node is directly connected to (and can communicate with) j neighbouring nodes (wherein j<n−1). Thus, node$_i$ is provided with a neighbourhood N$_i$, comprising j nodes (node$_p$, p=1 to j). The number of nodes to which a node is connected can be defined by the user, wherein the fault-tolerance (and convergence rate) of the preferred embodiment is improved by increasing the number of such nodes. In a preferred embodiment of the present invention, starting from a basic topology, e.g., the network 103 of FIG. 1 the user can indicate a number of additional connections according to the monitored performances of the network and the traffic. Alternatively, the number of optimal additional connections could be determined by means of monitoring tools which are able to monitor the network performances in order to evaluate the efficiency and speed of the network; another possibility is to rely on statistics of previously measured performances. The only condition imposed on the basic topology is that the graph formed by the virtual network must be connected, in other words, starting from each node it must be possible to reach any other node through an arbitrary number of steps.

In a ring topology as the one showed in FIG. 1, each node has only two connections and two neighbours. So, for example, referring to FIG. 1, node is directly connected to node$_2$ and node$_6$. Similarly, node$_2$ is directly connected to node and node$_2$; and node$_6$ is directly connected to node and node$_5$. Any topology of n nodes can be represented with a n×n matrix. The example of FIG. 1 can be represented with the following 6×6 matrix M:

$$\begin{matrix} 2 & -1 & 0 & 0 & 0 & -1 \\ -1 & 2 & -1 & 0 & 0 & 0 \\ 0 & -1 & 2 & -1 & 0 & 0 \\ 0 & 0 & -1 & 2 & -1 & 0 \\ 0 & 0 & 0 & -1 & 2 & -1 \\ -1 & 0 & 0 & 0 & -1 & 2 \end{matrix}$$

The Eigenvalues of such matrix are:
0, 1, 1, 3, 3 and 4

As explained by Yoonsoon Kim and Mehran Mesbahi (see Yoonsoon Kim, Mehran Mesbahi—"On maximizing the Second Smallest Eigenvalue of a State dependent Graph Laplacian"—IEEE TRANSACTIONS ON AUTOMATIC CONTROL, VOL. 51, No 1, JANUARY 2006) given a graph G with n nodes (without loops or multiple edges), its Laplacian matrix L is defined as:

$$l_{i,j} := \begin{cases} \deg(v_i) & \text{if } i = j \\ -1 & \text{if } i \neq j \text{ and } v_i \text{ adjacent } v_j \\ 0 & \text{otherwise} \end{cases}$$

where deg(v_i) is the number of nodes that are connected to the node i. Starting from a current topology (e.g., the Laplacian matrix M represented above) and assuming to add C additional connections among the existing nodes, the problem to be solved is to find the Laplacian matrix M$_1$ having the trace (Tr) equal to the trace of matrix M+C*2 with the greatest possible second-smallest eigenvalue;

In other words:
determining among all possible Laplacian matrix wherein Tr(M$_1$)=Tr(M)+C*2 that matrix M$_1$ having the greatest possible second-smallest eigenvalue.

In the cited article by Yoonsoon Kim and Mehran Mesbahi, it is demonstrated that using the proposed protocol the convergence speed is proportional to the second smallest eigenvalue of the Laplacian related to the network graph.

To maximize the convergence speed, we can use the approach proposed by Yoonsoon Kim and Mehran Mesbahi, in order to obtain the best logical topology to solve the consensus problem. Using this method, it is possible to obtain a logical topology that is the best small-world network.

In mathematics and physics, a small-world network is a type of mathematical graph in which most nodes are not neighbours of one another, but most nodes can be reached from every other by a small number of hops or steps.

In this way, it is possible to decrease the mean-shortest path length, so the states propagation is faster.

The algorithm by Yoonsoon Kim and Mehran Mesbahi (Kim-Mesbahi algorithm) is initiated at time t=0 with an initial graph (configuration) G0 and then for t=0, 1, 2, . . . we proceed to iteratively find the graphs that maximises lambda__2(LG(t+1)) where LG(t+1) is the Laplacian of graph G at time t+1. This greedy procedure is then iterated upon until the value of lambda__2(LG(t)) can not be improved further. We note that the proposed greedy algorithm converges, as the sequence generated it is non-decreasing and bounded.

Figure 2:
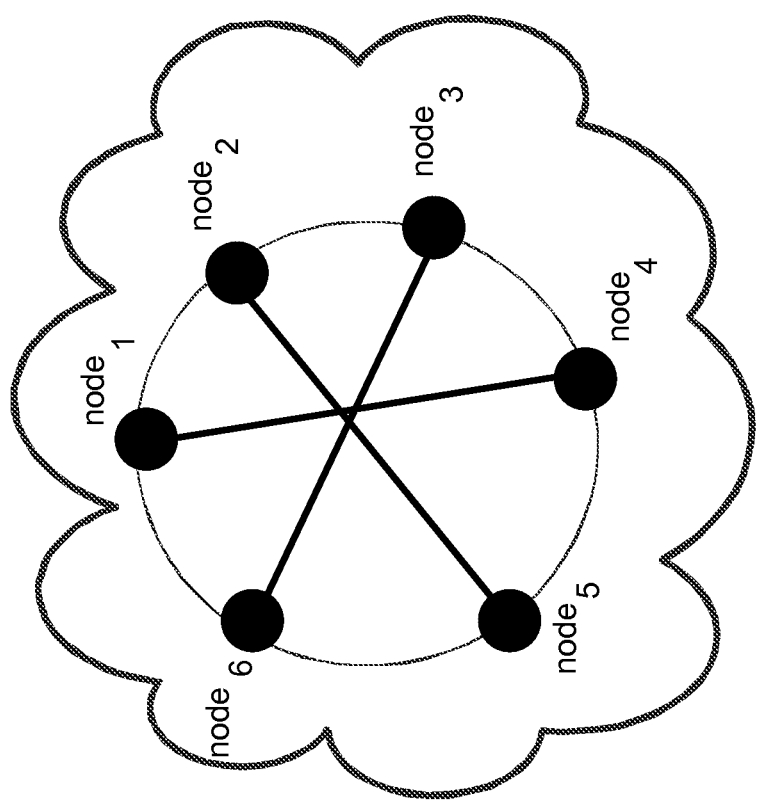
FIG. 2 shows the topology of FIG. 1 modified according to the method of the present invention.

With the method described by Yoonsoon Kim and Mehran Mesbahi it is possible, starting from a current topology and indicating how many additional connections are requested, to identify the best topology in order to maximise the convergence speed, i.e. the second smallest eigenvalue of the matrix representing the topology. Applying this algorithm to the ring topology represented with the matrix above we would obtain the following new matrix:

$$\begin{pmatrix} 3 & -1 & 0 & -1 & 0 & -1 \\ -1 & 3 & -1 & 0 & -1 & 0 \\ 0 & -1 & 3 & -1 & 0 & -1 \\ -1 & 0 & -1 & 3 & -1 & 0 \\ 0 & -1 & 0 & -1 & 3 & -1 \\ -1 & 0 & -1 & 0 & -1 & 3 \end{pmatrix}$$

which corresponds to the topology represented in FIG. 2.

The eigenvalues of the new matrix are the following:

0, 3, 3, 3, 3 and 6 which means that the convergence speed is proportional to 3 (the second smallest eigenvalue).

Figure 3A:
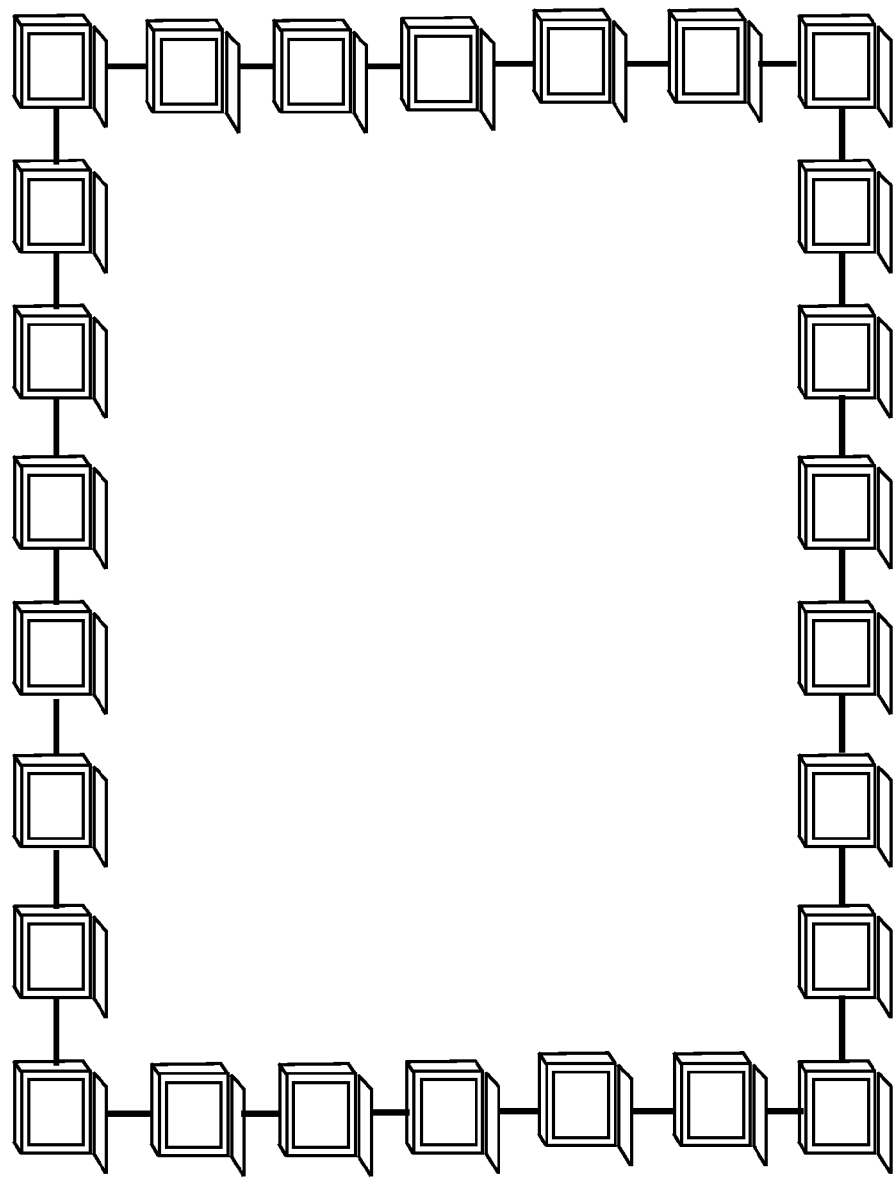
FIGS. 3a and 3b show an example of a computer network to which the method of the present invention is applied.
Figure 3B:
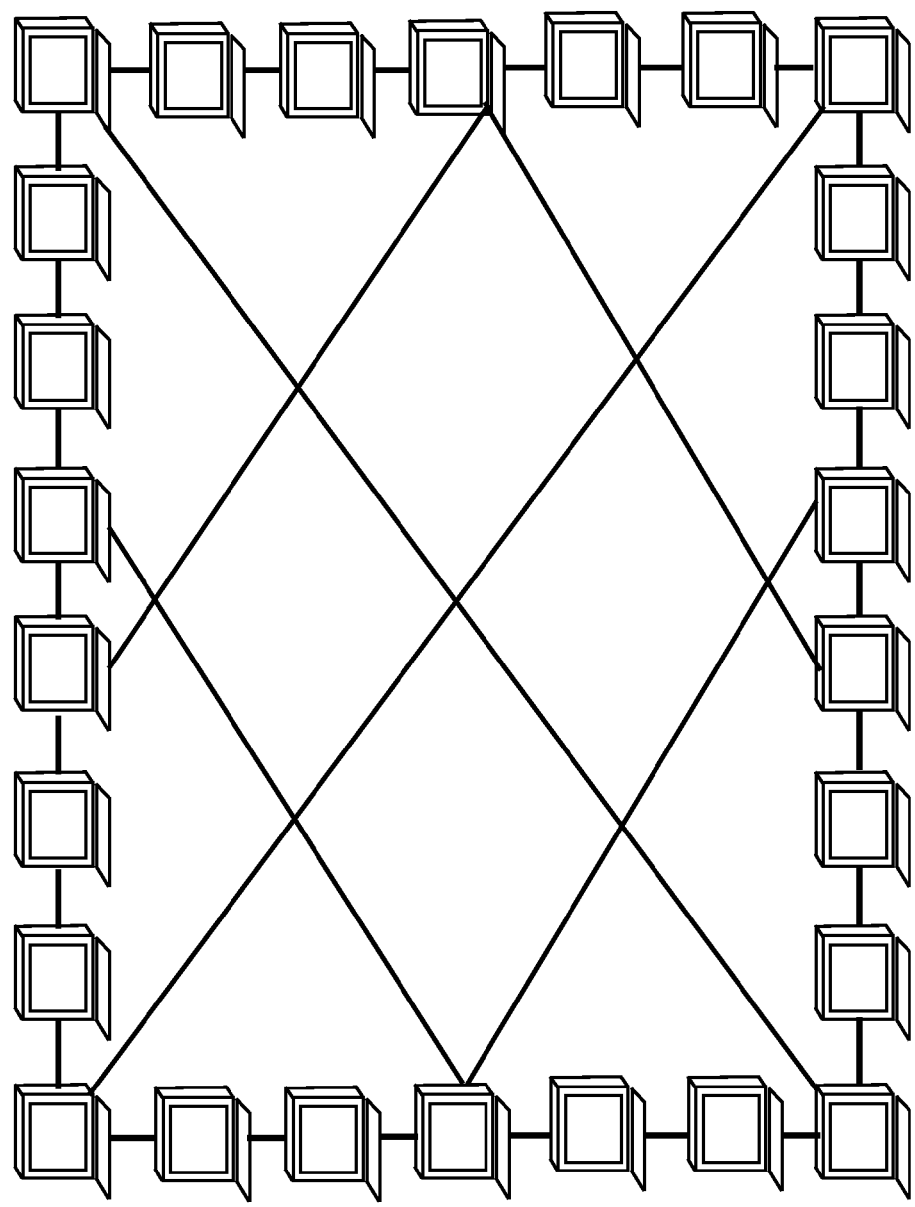

It will of course be realised that the topology shown in FIG. 1 and FIG. 2 is provided for example purposes only and should in no way be construed as limiting the preferred embodiment to a ring topology. In particular, the skilled person will understand that the preferred embodiment is operable with any topology and number of nodes in the distributed network 103 (subject to the above-mentioned connected constraint). FIG. 3a shows another (more complex) example. In this basic topology 26 nodes are connected in a ring configuration. Such a configuration is represented in a matrix of 26×26 (not represented here) having the second smallest eigenvalue equal to 0.0581. If we want to add 6 more connections to such topology and we apply the Kim-Mesbahi algorithm, we would obtain the topology shown in FIG. 3b which has an eigenvalue equal to 0.2413: this corresponds to a consensus convergence speed 415% higher than previous topology configuration and this is the highest value that is possible to obtain adding 6 connections.

Each node ($node_i$) in the virtual network comprises a used resources state variable indicating the extent to which the nodes' resources are occupied by the jobs currently running thereon. This information can be acquired from real-time resource consumption metrics gathered by monitoring software. In particular, defining the $o_i$ as the consumption metric vector associated with a given resource vector $res_i$, the extent to which a given node's resources are occupied (by currently running jobs) can be given by a scalar variable $state_i$, which is a weighted sum of the consumption metrics of the resource variables of a node ($node_i$) (i.e.

$$state_i = \sum_{l=1}^{r} \alpha_{i,l} o_{i,l}$$

[or in vector notation, state=$O^T$diag(a). (wherein state∈ $\mathcal{R}^{n \times 1}$, O ∈ $\mathcal{R}^{n \times i}$ and α∈ $\mathcal{R}^{n \times 1}$). The modified average consensus algorithm 16 in the preferred embodiment enables the nodes to propagate this information throughout the entire virtual network even to nodes to which the originating node is not directly connected.

A similar notation may be used to describe the requirements of a particular job (in the job repository). In particular, the net requirements ($e_q$) of a job ($job_q$) may be defined as $$e_q = \sum_{l=1}^{r} \beta_{q,l} req_{q,l}.$$

As explained in European Patent Application no. 08154507.1 the job scheduler is based on a modified version of the so called Consensus algorithm.

The average consensus model of a graph provides a distributed method of calculating graph evolution with an input $u_i$ to a $node_i$ and its neighbours ($N_i$). Thus, if the evolution of the $state_i$ of $node_i$ can be denoted by $state'_i = f_i(state_i) + u_i(state_i, state_p)$, p=1 to j, ∈$N_i$ ⟹ $state'_i = u_i(state_i, state_p)$, it can be demonstrated that $$state'_i = -\sum_{\substack{p=1 \text{ to } j \\ j \in N_i}} (state_i - state_p)$$

(continuous solution) or $$state_i(k+1) = \frac{1}{|N_i|+1}\left(state_i(k) + \sum_{\substack{p=1 \text{ to } j \\ j \in N_i}} state_p(k)\right)$$

(discrete solution) asymptotically solves the consensus problem into a connected graph. Accordingly, the dynamic system converges to the mean of the initial states, $$\lim_{i \to \infty} state_i = \frac{1}{j}\sum_{p=1}^{j} state_p(0)$$

(continuous solution) or $$\lim_{k \to \infty} state_i = \frac{1}{j}\sum_{p=1}^{j} state_p(0)$$

(discrete solution), wherein the proof for these limits is derived from the related Nyquist diagram therefore.

The preferred embodiment modifies the above-mentioned traditional average consensus algorithm by introducing a virtual node V (not shown), which is directly connected to all of the other nodes within the virtual network. Thus, the virtual node V is included within the neighbourhood $N_i$ of a $node_i$. Using this approach, each node ($node_i$) calculates its next state ($state_i(k+1)$) from:
  its current state ($state_i(k)$); and
  the current states of the other nodes (including the virtual node V) in its neighbourhood $N_i$ using the following formula $$state_i(k+1) = \frac{1}{|N_i|+1}\left(state_i(k) + \sum_{\substack{p=1 \text{ to } j \\ j \in N_i}} state_p(k)\right).$$

The virtual node V has a user-configurable, fixed state which represents the desired workload of all the nodes in the virtual network. The inclusion of the virtual node V into the neighbourhood of each node in the virtual network causes the average consensus algorithm with all the other nodes in the virtual network to balance against and converge to the fixed state of the virtual node V (wherein the convergence speed is related to the Laplacian of the network graph). Thus, by making the state of the virtual node V configurable by the user, the preferred embodiment effectively provides a mechanism for tuning a workload schedule to meet a desired usage of the resources of the nodes (i.e. operating point) in the virtual network (i.e. to effectively alter the operating point of the virtual network).

The job-selection module 109 enables a node ($node_i$) to select a job (from the job repository 10) to execute next, in accordance with the node's current state and its calculated next state. In particular, if $state_i(k+1)<state_i(k)$, then no new job is to be undertaken by the node at the next iteration. However, if $state_i(k+1) \geq state_i(k)$, a difference variable $\Delta$ is defined as $\Delta = state_i(k+1) - state_i(k)$ (i.e. the difference between the calculated next state of $node_i$ and the current state of the node). The next job ($job_{k+1}$) selected (from the job repository) is the job ($job_t$) whose net requirements variable ($e_t$) has minimal difference from the difference variable $\Delta$ (i.e. $e_t | min_t (\Delta - e_t)$).

Figure 4:
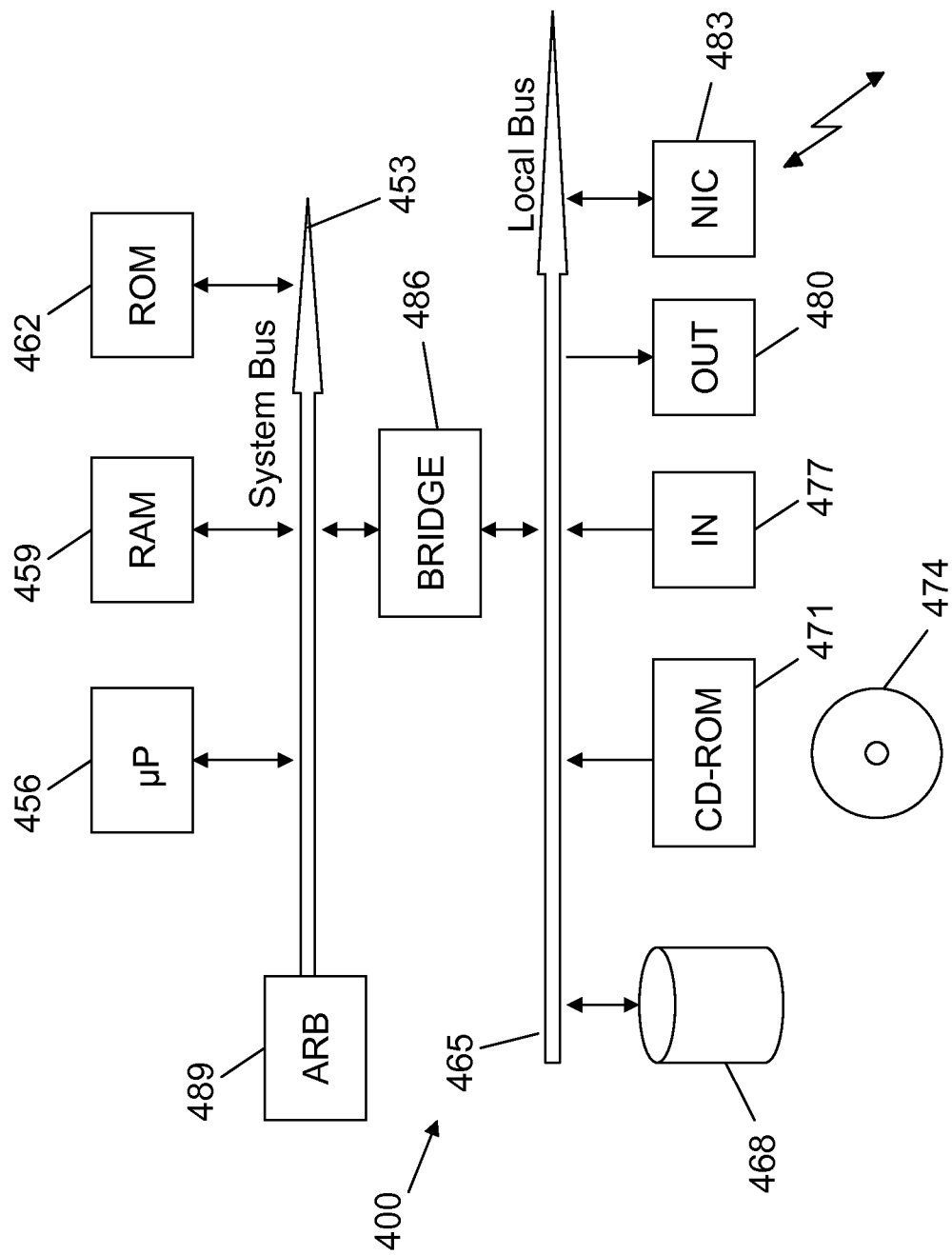
FIG. 4 is a diagram of a general computer system adapted to support the method of workload scheduling of the preferred embodiment.

With reference to FIG. 4, a generic computer of the system (e.g., computer, Internet server, router, remote servers) is denoted with 450. The computer 450 is formed by several units that are connected in parallel to a system bus 453. In detail, one or more microprocessors 456 control operation of the computer 450; a RAM 459 is directly used as a working memory by the microprocessors 456, and a ROM 462 stores basic code for a bootstrap of the computer 450. Peripheral units are clustered around a local bus 465 (by means of respective interfaces). Particularly, a mass memory consists of a hard-disk 468 and a drive 471 for reading CD-ROMs 474. Moreover, the computer 450 includes input devices 477 (for example, a keyboard and a mouse), and output devices 480 (for example, a monitor and a printer). A Network Interface Card 483 is used to connect the computer 450 to the network. A bridge unit 486 interfaces the system bus 453 with the local bus 465. Each microprocessor 456 and the bridge unit 486 can operate as master agents requesting an access to the system bus 453 for transmitting information. An arbiter 489 manages the granting of the access with mutual exclusion to the system bus 453. Similar considerations apply if the system has a different topology, or it is based on other networks. Alternatively, the computers have a different structure, include equivalent units, or consist of other data processing entities (such as PDAs, mobile phones, and the like).

Figure 5:
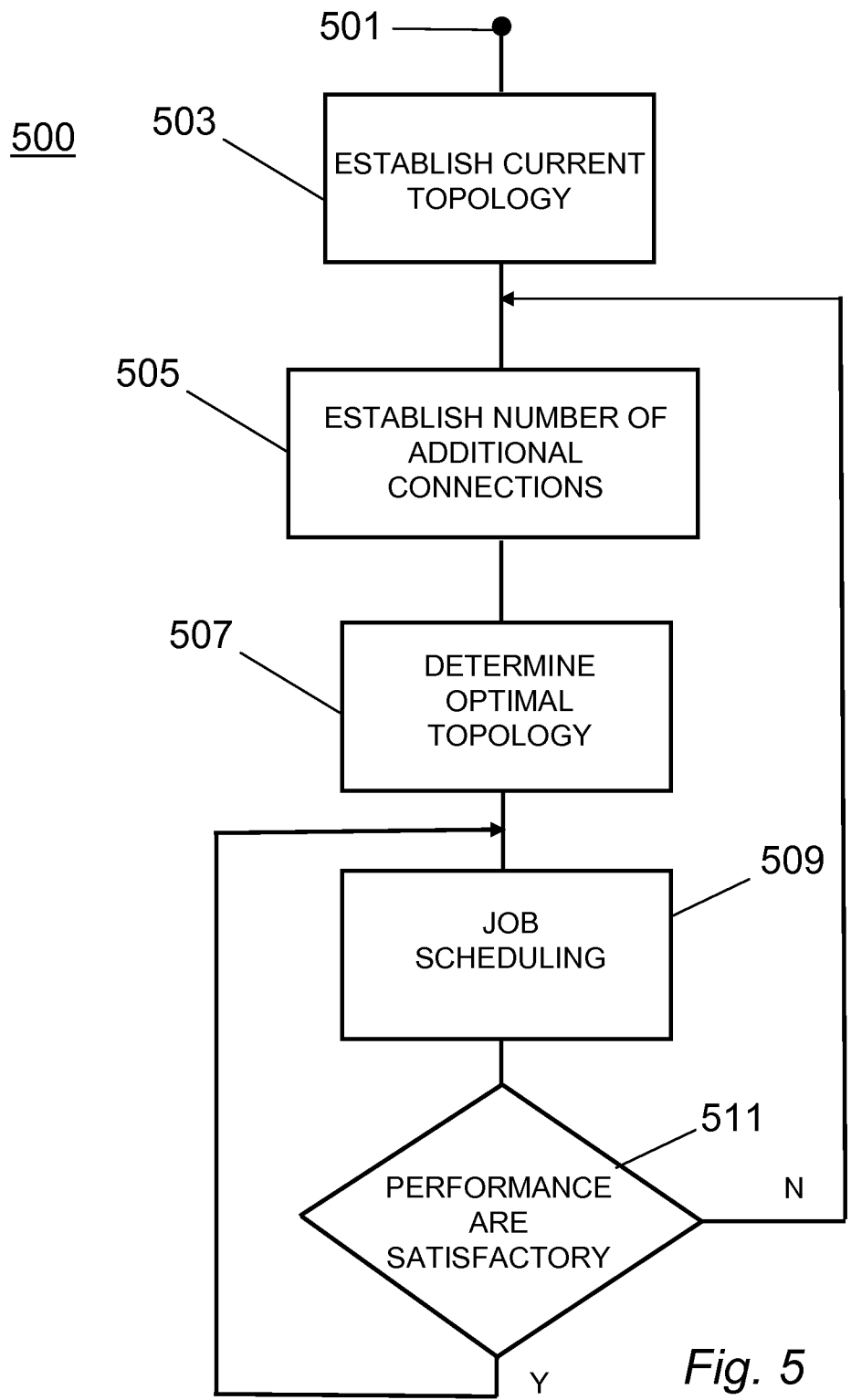
FIG. 5 shows a flowchart representing the steps to perform a method according to a preferred embodiment of the present invention.

FIG. 5 schematically shows the method steps according to a preferred embodiment of the present invention (500). The process starts at step 501 and goes to step 503 where the current topology of the network is determined and represented with a matrix M as explained above. According to a preferred embodiment of the present invention, the dimension of the matrix M is n×n where n is the number of the nodes in the network. At step 503, the user (or administrator) of the network is allowed to indicate how many additional connections are desired. The determination of the number of required additional connections can take into account several parameters (e.g., network traffic, system performance, geographic configuration of the network) and can be determined in several different ways; those skilled in the art will appreciate that this determination can be done with existing tools or even indicated manually by the administrator. The number of optimal additional connections could also be determined by means of monitoring tools which are able to monitor the network performances in order to evaluate the efficiency and speed of the network; another possibility is to rely on statistics of previously measured performances. The matrix M and the number of additional connections required are then input to the Kim-Mesbahi which is able to determine the optimal topology of the network, by finding the matrix $M_1$ having the maximum second-smallest eigenvalue of all possible solutions. In a preferred embodiment of the present invention the process continues as explained above with the job scheduling process (step 509) which is based on the modified consensus algorithm. Optionally (step 511) the performances of the new network are monitored to determine whether they are satisfactory or not. If they are determined to be satisfactory, the normal job scheduling activities can continue, otherwise a new re-configuration of the network is considered and the control goes back to step 505. Another possible alternative could be to increment by 1 the number of additional connections until the performances are determined to be satisfactory at step 511.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method, in a network of a plurality of N nodes being connected together, for executing jobs based on computation of an improved network topology, the improved network topology including a number C of additional connections with respect to a current topology, the method comprising:

representing the current topology of the network of the plurality of N nodes by means of an N×N Laplacian matrix M wherein values $l_{i,j}$ are defined as follows $$l_{i,j} := \begin{cases} \deg(v_i) & \text{if } i = j \\ -1 & \text{if } i \neq j \text{ and } v_i \text{ adjacent } v_j \\ 0 & \text{otherwise} \end{cases}$$

wherein $\deg(v_i)$ is a number of nodes that are connected to the node i and wherein $1 \leq i \leq N$ and $1 \leq j \leq N$;

calculating an N×N Laplacian matrix $M_1$ having $Tr(M_1)=Tr(M)+C*2$ and having a greatest possible second-smallest eigenvalue;

modifying the network topology into an improved topology by adding C additional connections according to the calculated N×N Laplacian matrix $M_1$;

starting from the modified network topology for distributing scheduling of jobs on the nodes of the modified network topology.

2. The method of claim 1 wherein the improved network topology is a small-world network.

3. The method of claim 1 wherein the calculating the N×N Laplacian matrix $M_1$ having $Tr(M_1)=Tr(M)+C*2$ and having the greatest possible second-smallest eigenvalue includes applying the Kim-Mesbahi algorithm.

4. The method of claim 1 further comprising the step of:
prompting a user for input a desired value of the number of C additional connections.

5. The method of claim 1 further comprising:
monitoring the network performances to measure a value indicative of the efficiency of the network;
determining the number C of additional connections according to the measured efficiency.

6. The method of claim 1 wherein the distributing scheduling of jobs on the nodes of the modified network topology comprises:
establishing a desired at least one operational resource value for the network inside the network topology;
determining the current usage of resources of at least some of the nodes in the network, by one or more jobs being executed thereon;
calculating a predicted state value for each computer in the network from the current usage of the nodes resources and the desired operating point; and
selecting another job to be executed next by one of the nodes in the network in the event the computer's predicted state value substantially exceeds the current usage of the computer's resources.

7. The method as claimed in claim 6 wherein the determining the current usage of the resources of at least some of the nodes in the network comprises the step of acquiring information relating to the current usage of the resources from resource consumption metrics gathered by monitoring software.

8. The method as claimed in claim 6 wherein in the event a computer's predicted state value substantially exceeds the current usage of the computer's resources, a job is selected for execution thereby, whose resource requirements are closest to the difference between the computer's predicted state value and the current usage of the computer's resources.

9. A system for scheduling a workload in a network of a plurality of N nodes being connected together, for executing jobs based on computation of an improved network topology, the improved network topology including a number C of additional connections with respect to a current topology, comprising:
a processor;
a memory for containing a set of instructions which when executed by the processor perform a method comprising:
representing the current topology of the network of the plurality of N nodes by means of an N×N Laplacian matrix M wherein the values $l_{i,j}$ are defined as follows $$l_{i,j} := \begin{cases} \deg(v_i) & \text{if } i = j \\ -1 & \text{if } i \neq j \text{ and } v_i \text{ adjacent } v_j \\ 0 & \text{otherwise} \end{cases}$$

wherein $\deg(v_i)$ is a number of nodes that are connected to the node i and wherein $1 \leq i \leq N$ and $1 \leq j \leq N$;

calculating an N×N Laplacian matrix $M_1$ having $Tr(M_1)=Tr;(M)+C*2$ and having a greatest possible second-smallest eigenvalue;

modifying the network topology into an improved topology by adding C additional connections according to the calculated N×N Laplacian matrix $M_1$;

starting from the modified network topology for distributing scheduling of jobs on the nodes of the modified network topology.

10. A computer program product in a computer storage device comprising instructions for carrying out a method when the instructions are executed on a computer system, the method comprising: in a network of a plurality of N nodes being connected together, for executing jobs based on computation of an improved network topology, the improved network topology including a number C of additional connections with respect to a current topology, the method comprising:
representing the current topology of the network of the plurality of N nodes by means of an N×N Laplacian matrix M wherein the values $l_{i,j}$ are defined as follows $$l_{i,j} := \begin{cases} \deg(v_i) & \text{if } i = j \\ -1 & \text{if } i \neq j \text{ and } v_i \text{ adjacent } v_j \\ 0 & \text{otherwise} \end{cases}$$

wherein $\deg(v_i)$ is a number of nodes that are connected to the node i and wherein $1 \leq i \leq N$ and $1 \leq j \leq N$;

calculating an N×N Laplacian matrix $M_1$ having $Tr(M_1)=Tr;(M)+C*2$ and having a greatest possible second-smallest eigenvalue;

modifying the network topology into an improved topology by adding C additional connections according to the calculated N×N Laplacian matrix $M_1$;

starting from the modified network topology for distributing scheduling of jobs on the nodes of the modified network topology.

\* \* \* \* \*